Figure 1:
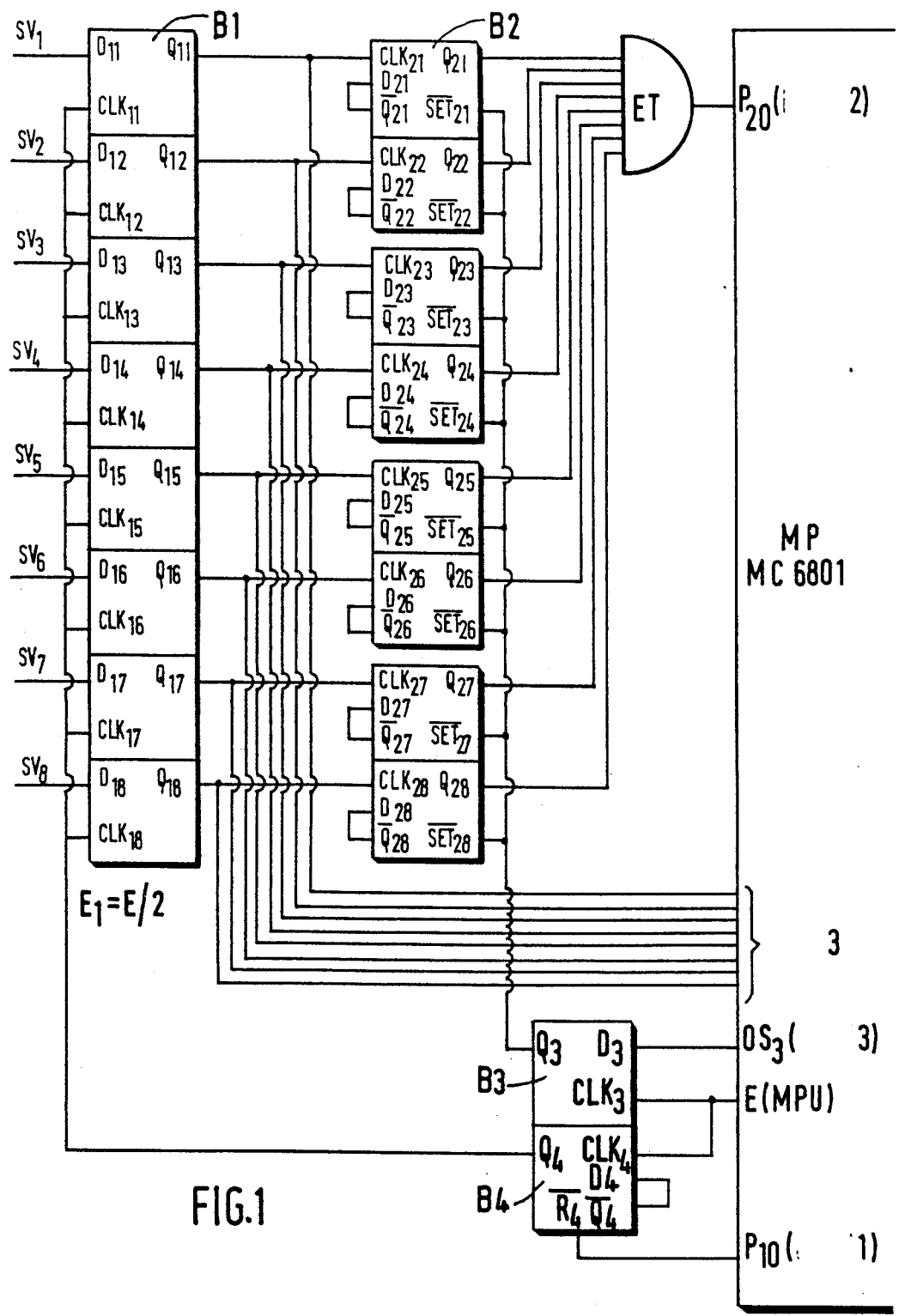

United States Patent [19]

Nozeran et al.

[11] Patent Number: 4,731,746

[45] Date of Patent: Mar. 15, 1988

[54] ELECTRONIC DEVICE FOR THE ACQUISITION OF ASYNCHRONOUS PERIODIC SIGNALS

[75] Inventors: Jean-Marc Nozeran; Jean-Marc Villevielle; Serge Nauleau, all of Toulouse, France

[73] Assignee: Bendix Electronics S.A., Toulouse, France

[21] Appl. No.: 797,059

[22] Filed: Nov. 12, 1985

[30] Foreign Application Priority Data

Nov. 27, 1984 [FR] France ................. 84 18043

[51] Int. Cl.$^4$ .................. G01P 3/00; G06G 7/70
[52] U.S. Cl. .................. 364/565; 364/424; 364/426; 377/66
[58] Field of Search ............... 364/415, 431.05, 431.12, 364/424, 565, 426; 377/54, 55, 56, 66; 307/445, 527, 528, 529; 328/151; 358/138; 123/478, 480

[56] References Cited

U.S. PATENT DOCUMENTS

| | | | |
|---|---|---|---|
| 3,324,458 | 6/1967 | MacArthur | 364/551 X |
| 3,736,575 | 5/1973 | Mallerich, Jr. | 377/66 X |
| 3,786,440 | 1/1974 | Toyen | 377/54 X |
| 3,881,094 | 4/1975 | Taylor et al. | 364/424 |
| 3,936,663 | 2/1976 | Taylor et al. | 364/424 X |
| 4,184,203 | 1/1980 | Skarvada | 364/565 X |
| 4,309,759 | 1/1982 | Tokuda et al. | 364/431.12 X |
| 4,400,818 | 8/1983 | Shapiro | 377/54 |
| 4,497,026 | 1/1985 | Braschel et al. | 364/426 |
| 4,530,059 | 7/1985 | Brearley et al. | 364/426 |

FOREIGN PATENT DOCUMENTS 0115202 8/1984 European Pat. Off.
2509242 1/1983 France.

OTHER PUBLICATIONS

Smith, L. "Microcomputer Technology for Trucks and Vehicle Applications", *Electronic Technologies and Systems for Commerical Vehicles of the 80's*, SP 505, Society of Automotive Engineers, Nov. 1981, pp. 1-7.
Patent Abstracts of Japan, vol. 6, No. 256, 15 Dec. 1982, and JP-A-57-151-455, (Nissan Jidosha K.K.), 18-0-9-1982.

Primary Examiner—Parshotam S. Lall
Assistant Examiner—Joseph L. Dixon
Attorney, Agent, or Firm—Russel C. Wells; Markell Seitzman

[57] ABSTRACT

The invention relates to a device for the acquisition and the processing of N asynchronous and periodic signals, such as velocity signals, N being preferably between 1 and 8, including a set of N synchronization flip-flops (B1) followed by a set of N storage flip-flops (B2) whose output is applied to a dedicated circuit via an N-input AND gate type assembly, the N synchronization flip-flops being sample by a flip-flop system (B4) from the clock of the dedicated circuit and the N automatic flip-flops (B1) being reset from said clock by an automatic flip-flop (B3).

13 Claims, 6 Drawing Figures

ELECTRONIC DEVICE FOR THE ACQUISITION OF ASYNCHRONOUS PERIODIC SIGNALS

The present invention relates to electronic devices for the acquisition of asynchronous periodic signals using a single microprocessor. These devices are essentially intended to be integrated into automatic and/or safety systems such as antiskid braking systems, antislip systems, electronic assisted steering and so-called controlled suspension systems on automobiles or heavy vehicles. In the following text and in order to clarify the concepts, reference will be made to the application to antiskid braking systems making use of the measurement of the velocities of different wheels. Transposition to other applications based on these same parameters and/or others is within the capability of specialists in the field and does not fall outside the scope of the present invention.

In particular it will be noted that as regards the velocities of the wheels, if electronic acquisition devices exist in the prior art, they use one measuring circuit for two velocities which necessitates two circuits for four wheels and the volume capacity of standard housing is exceeded if it is necessary to equip a vehicle with more than four wheels, for example a six-wheeled vehicle.

Still for the purpose of clarifying concepts, we shall here deal, by way of example, with the six-wheeled heavy vehicles that are more and more common on the market and for which the safety and/or automatic device requirements are more and more frequent.

It is pointed out that the velocity data correspond with frequency ranges of approximately 0 to 1.2 kHz for heavy vehicles with more than four wheels, and 0 to 1.8 kHz for four-wheeled vehicles.

It should also be noted that problems often arise which can at first sight throw up, at least in appearance, if not incompatibilities, at least antagonisms. Thus, in the case of application to antiskid braking systems, it is necessary to provide a compromise between:

on the one hand a high accuracy in the measurement of the velocities (such as instantaneous wheel speeds)

on the other hand, a fast response, and to provide this no matter what the periods of the signals may be. It is therefore found necessary to measure each period separating two edges of the same type (rising or falling) without omitting any data on these edges.

Now, as has already been emphasized, the maximum capacity of a standard housing only authorizes two measuring sub-circuits each measuring two velocities by means of a special circuit (essentially microprocessors or specific counters), from which arises the limitation to four wheels, which is not sufficient on utility vehicles having more than four wheels.

The purpose of the present invention is to achieve the acquisition of asynchronous periodic signals and in particular more than four of them, making use of only one microprocessor that can be standard and with a small number of external circuits. According to the invention, we succeed in acquiring, with a standard type 8-bit microprocessor, up to 8 asynchronous periodic signals, which in practice results in the acquisition of from 1 to 8 signals of this type.

In the example given hereafter, when it is applied to a 6-wheel antiskid braking system, it is possible to make use of a relatively size-reduced printed circuit fitted into a single standard housing and using a single, standard 8-bit microprocessor.

The essential purpose of the present invention is therefore devices for the acquisition and real time computation of velocity signals preferably from 1 to 8, having a single timer input for a single microprocessor or single special processing circuit which is used for the common measurement processing of all the occurring signals. These devices enable the acquisition and real time computation of the frequency of any asynchronous periodic signals, the use of special external circuitry and of the microprocessor's timer input which gives rise to a high accuracy of measurement and a short response time.

These devices can in particular be applied to various antiskid braking systems for vehicles, electronically assisted vehicle steering systems, or electronically assisted suspension systems.

In these devices it is possible to acquire and process from 1 to 8 asynchronous periodic signals of any type whatsoever, the measurable frequency ranges being inversely proportional to the number of signals measured with the timer input. With an 8-bit microprocessor using a basic clock of 1 MHz, the maximum frequency of a signal is thus in the order of 7.2 kHz.

These devices also have means for the external storage of the occurring signals making use of a first stage for synchronization and a second stage for storage. The resetting of this storage stage is carried out automatically when the reading is completed. In order to do this the sampling output of the microprocessor is used without loss of data and in minimum time, a set of flip-flops storing the occurrence of any event whatsoever.

In order to give a better understanding of the technical characteristics and the advantages of the present invention, an example of embodiment will now be described on the understanding of course that this is not limiting as regards its implementation or the applications that can be made of it.

Figure 4:
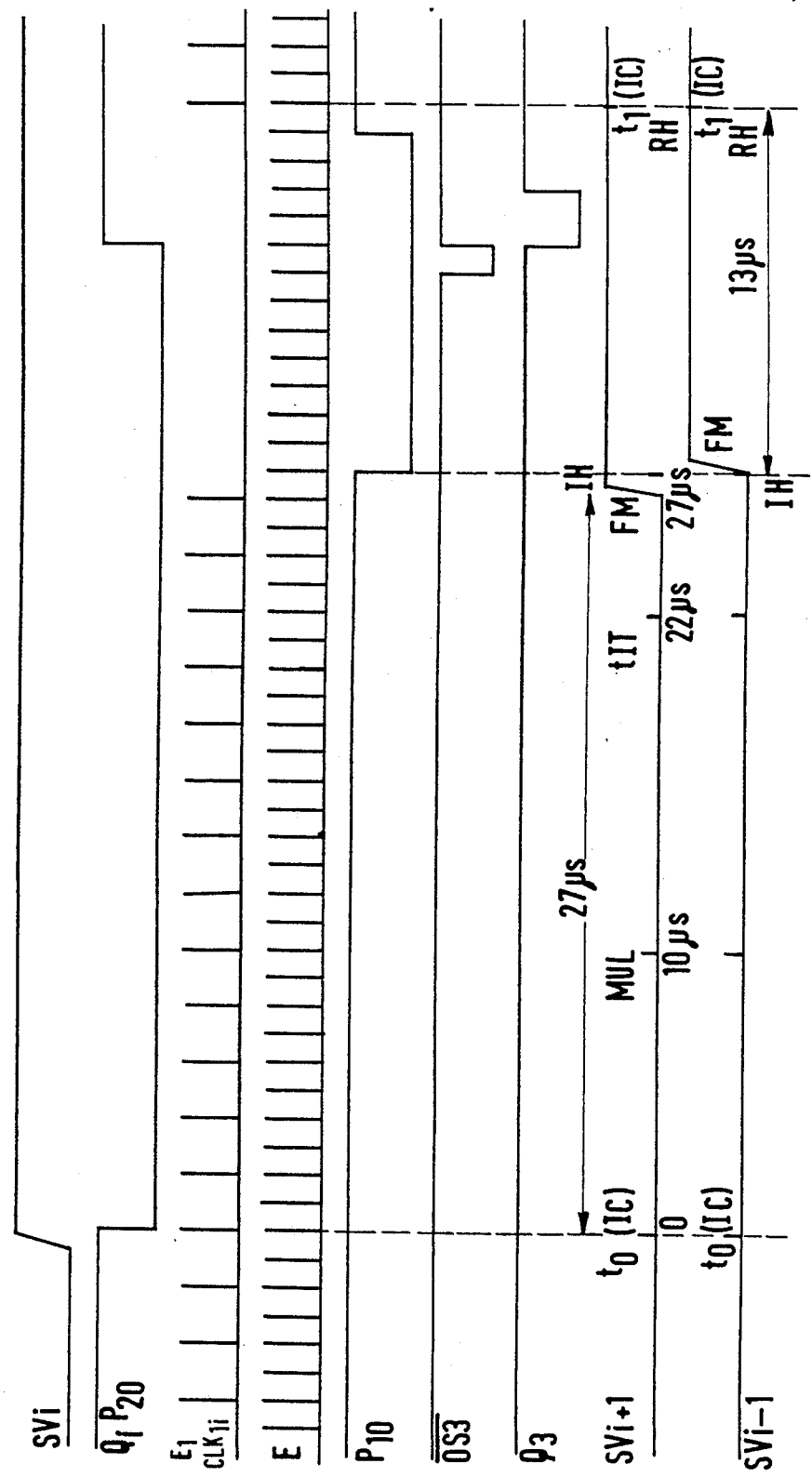
Figure 2:
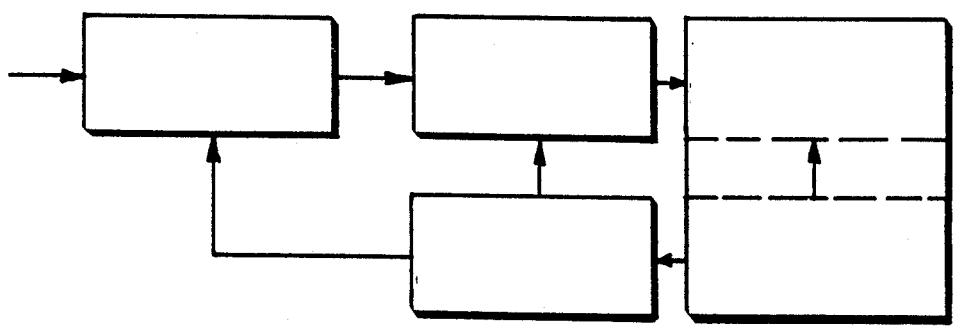
Figure 3:
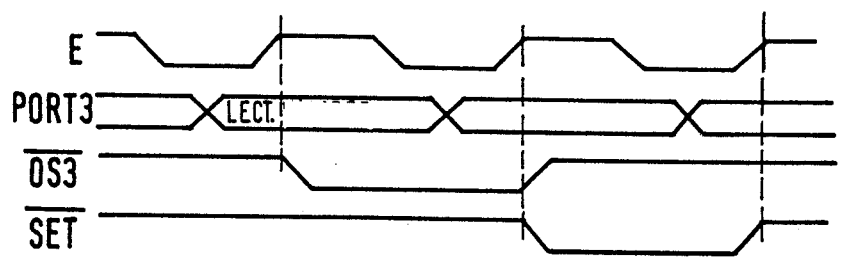
Figure 5:
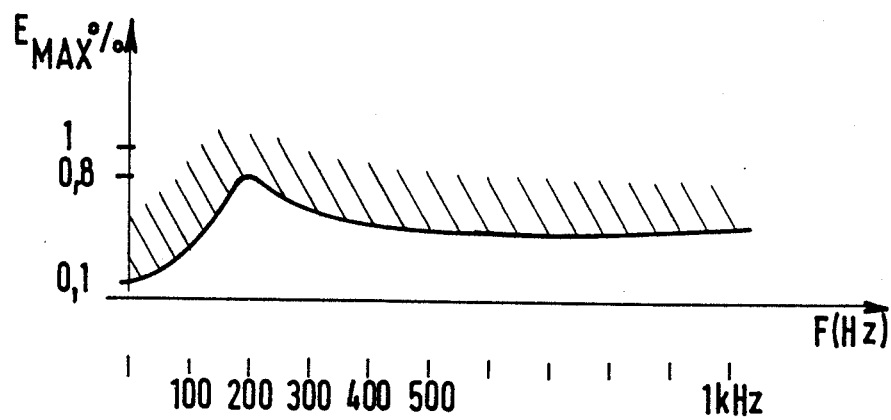
Figure 6:
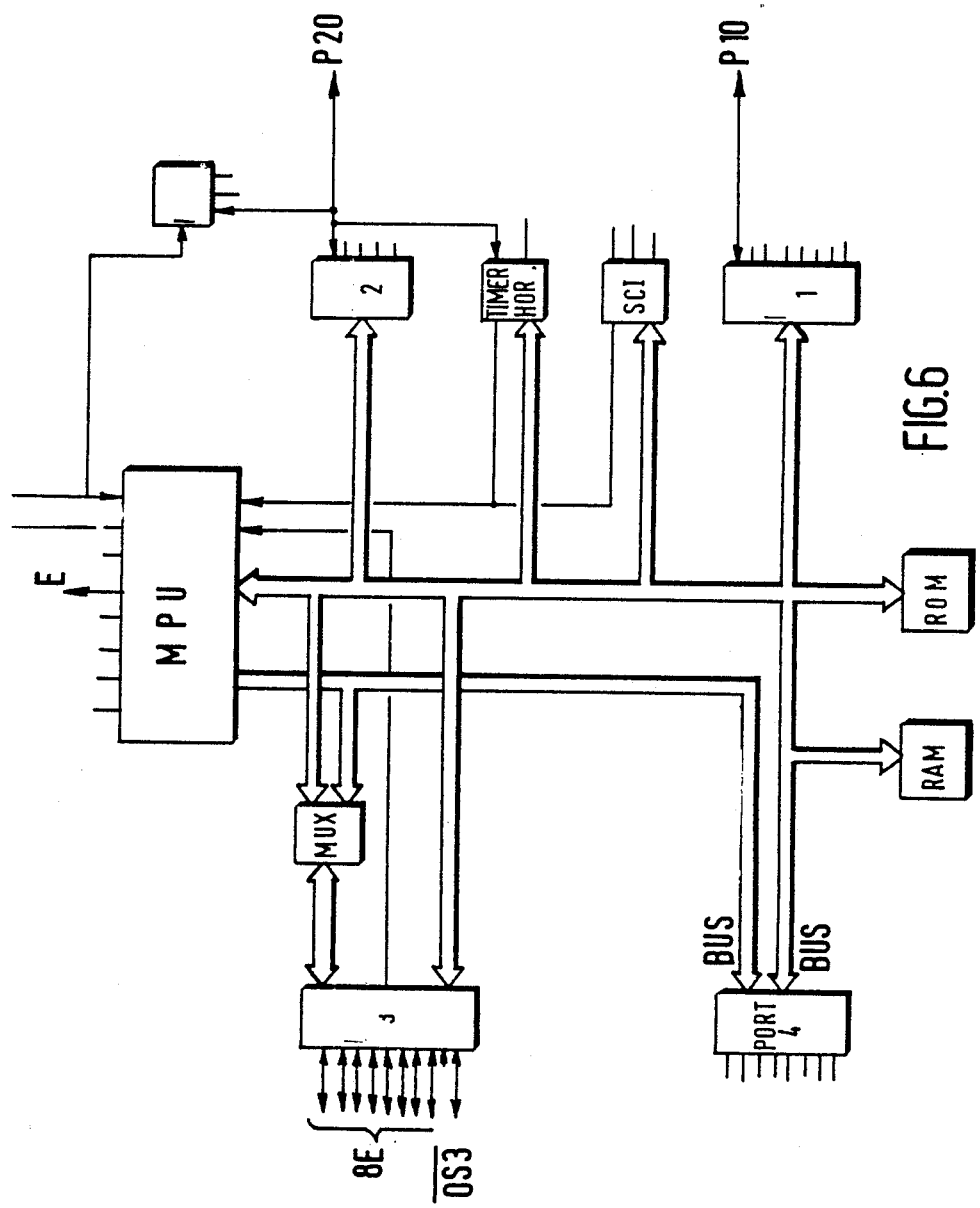

Reference will be made to the following figures which diagrammatically show:

in FIG. 1, a block diagram of a device according to the invention;

in FIG. 2, a block diagram of the complete device according to the invention;

in FIG. 3, a timing diagram of the sampling and reset signals;

in FIG. 4, a timing diagram of all the main signals;

in FIG. 5, a maximum error distribution curve as a function of frequency;

in FIG. 6, a block diagram of the MC 6801 microprocessor manufactured by MOTOROLA and used in the embodiment shown in FIG. 1 (microprocessor MP).

In the following text and for purposes of simplification, it will be assumed that the periodic signals have been shaped in a previous stage of any suitable type and are therefore signals that are transistor transistor logic (TTL) compatible or complementary metal oxide semiconductor (CMOS) compatible. We shall start with the case of a single velocity signal SV1 (FIG. 1) in order to describe its processing and then we shall move into the case of eight non-simultaneous signals (SV1 to SV8, FIG. 1). The shaped velocity signal SV1 is inputted at D11 into a synchronization stage (FIGS. 1 and 2) formed by flip-flop B1 of the edge-triggered D-type sampled at CLK11 derived from the clock E of the microprocessor MP at a frequency E1 equal to half that of the clock E.

In this way at each rising edge of the signal ariving at CLK11, the signal taken from Q11 takes the value of the signal arriving at D11. If the clock of the microprocessor is operating at 1 Mhz, E1 is therefore 500 kHZ, such that every 2 microseconds, Q11 is put to the same value as D11, which ensures synchronization. The signal is then processed by the edge-triggered D-type flip-flop B2 which it enters via clock input CLK21. When $\overline{SET21}$ is in the 0 state, with Q being in the 1 state at each rising edge of the Q11 signal arriving at CLK21, Q21 takes the value of D21, then, due to the $\overline{Q}$ to D connection, the value Q21. The rising edge is thus stored until the microprocessor MP has processed this data. Output Q21 of flip-flop B2 is applied to one of the inputs of the 8-input logic AND gate (or one of the inputs of two 4-input logic AND gates) and normally remains in the 1 state. When a rising edge appears, Q21 goes from the 1 state to the 0 state which switches the gate and creates an interrupt via PORT 2-P20 (the input capture IC) of the microprocessor MP which automatically stores the time at which the interrupt occurs.

In the case of operating with 8 velocities, each velocity signal SV1 to 8 is applied to one of the flip-flops in column B1 and the operation is identical, the description given above applying to any other signal by replacing the last index 1 by the index of the corresponding signal: D11 by D12 to D18, CLK21 by CLK22 to CLK28, etc.

When the microprocessor has thus automatically stored the time of appearance of the interrupt, it enters into a process according to the following series of operations; reference will be made to FIG. 6 which shows the section of the diagram of the MC 6801 microprocessor from MOTOROLA particularly suited to the present invention. The various ports will be found there under the same references, the other elements being designated by their conventional intitials. This diagram is standard.

(1) Inhibition of sampling clock E/E1:

PORT 1-P10=0 gives the RESET command of flip-flop B4 of the edge triggered D-type which blocks the sampling in the B1 flip-flop series of velocity signals via Q4 and CLK11 to CLK18 such that interrupts can no longer occur until the sampling has been authorized again.

(2) Reading the time at which the interrupt occurs:

This reading is carried out on the input capture register P20 (PORT 2) of the microprocessor.

(3) Reading the output states of the B2 flip-flops and automatic resetting of their stages:

The reading is used to detect on which signal (or on which simultaneous signals) a transition takes place (up to 8 signals), the automatic resetting being carried out simultaneously with the reading. Each output Q11 to Q18 of the series of flip-flops B1 is connected to an input of the microprocessor MP at PORT 3 which has eight available inputs (FIG. 6); the reading at PORT 3 is accompanied by the sending of an output strobe signal OS3 (also PORT 3) (normally used for the dialogue between microprocessor MP and peripherally via the said PORT 3, the signal going to 0 during a read and to 1 during a write). This sending of a strobe signal OS3 (PORT 3) is sequenced with the internal clock as shown in FIG. 3, OS3 going from the 0 state to the 1 state or vice-versa at each arrival at the 1 state of the clock signal E (OS3=OUTPUT STROBE).

In order to only reset the flip-flops after being assured of having correctly read the output states, the signal OS3 received at D3 is shifted by one cycle by flip-flop B3 of the edge-triggered D-type sampled at CLK3 by the internal clock E of the microprocessor MP: the SET signal only arrives at $\overline{SET21}$ to 28 of flip-flops B2 from Q3 on the rising edge following that of the clock (FIG. 4).

(4) Authorization of automatic transfer of the counter.

(5) Validation of sampling clock E1 and authorization of "reentrant" interrupts:

The reading of the status and timer control (timer TR CSR) register authorizes the automatic transfer in the event of interruption of the input capture. This reading is followed by setting P10 (PORT 1) to the 1 state which causes the validation of the clock E1 on the B1 flip-flops stage. At this time, the microprocessor MP retains in registers the following data which can be saved:

index X, X+1: time T1 of occurrence of a rising edge;

accumulator A: image of the input (or inputs) on which the rising edge occurs.

At this time, the microprocessor can validate new interupts since registers A and X are not destroyed (saved in the stack in the case of a new interrupt, which is most often called a "re-entrant" interrupt system).

All the operations can be represented diagrammatically by referring to FIG. 4, for a velocity signal SVi. It results in the reading at P20 (PORT 2) of a signal Q2i which goes from the 1 state to the 0 state at the first rising edge of CLK1i following the SVi step. This signal will return to the 1 state when Q3 ($\overline{SET}$) passes from the 1 state to the 0 state. The frequency CLK1i=E1 is half that of the clock E of the microprocessor. The signals CLK1i=E1 are inhibited when P10 goes from the 1 state to the 0 state and are revalidated when P10 returns to the 1 state. No interrupt can occur while sampling remains unauthorized.

The transition of P10 from the 1 state to the 0 state is followed by the strobe signal $\overline{OS3}$ (PORT 3) going to the 0 state immediately followed (except for one E cycle) by Q3 ($\overline{SET}$) going to 0 and therefore the return of Qi to the 1 state. We shall return later to the last two elements of this timing diagram in FIG. 4. If all these operations are considered, the maximum measuring errors can be defined: they are divided into two cases according to their sign.

Negative Error

Referring to the timing diagram in FIG. 4 (the penultimate graph) (in microseconds), this is the case when the edge FM appears just before the inhibiting IH of the sampling clock, while the interrupt took place at the start of a MUL instruction (the longest in the program). There are 10 µs of delay between the input capture (IC) time t0, 12 µs for the start of the interrupt and 5 µs for the start of the interrupt program before inhibition, which gives 27 µs of negative error.

Positive Error

Referring to the timing diagram of FIG. 4 (last graph), this is the case of the FM edge appearing just after the inhibition IH of the clock, and which will be taken into account with a delay due to the interrupt program, i.e. up to the revalidation of the clock RH, or 13 µs.

These evaluations given by way of illustration are based on a microprocessor whose clock operates at 1 MHz, or with a period of 1 µs. The computation of a period T between two edges of the same direction thus results from the difference between the time of arrival of the first and that of the second: in the present example it works out at about 27+13=40 μs.

The degree of accuracy of the evaluation of velocity on the basis of the frequencies/periods thus determined can be deduced. The internal clock of the microprocessor determines the consecutive measurement windows, namely 10 ms; during such a window, the time of occurrence of the first edge t1 is stored and the number of successive edges is counted up to the Nth and last tN appearing in the window.

The mean period is therefore:

$$tm = \frac{tN - t1}{N - 1}$$

The maximum relative error made over this mean period is therefore the ratio between the maximum absolute error and the minimum duration between the first and last edges. In the worst cases, i.e. when the period of the signal is slightly greater than 5 ms, which gives only two edges in a window of 10 ms (N=2, N−1=1)

$$E_{max} = \frac{40 \ \mu s}{5 \ ms} = 0.8\%$$

We can thus claculate the maximum error as a function of frequency (FIG. 5): in practice it remains between 0.1 and 0.8%, the latter value corresponding to the most unfavorable case. The field of error is therefore contained between the curve in FIG. 5 and the x axis.

It can thus be stated, as confirmed by experience, that it is possible, with a very low volume and a single standard microprocessor, to monitor and process eight different velocities and compute them in real time with very low errors. The data stored in the microprocessor and the velocities computed in real time will therefore be used as a basis of computation for the various vehicle applications mentioned above (anti-skid braking, assisted steering, controlled suspension, anti-slip and others). It is also noted on referring to FIG. 1 that it is possible to mount 1 circuit connected to 8 D-type flip-flops (B1) 5 D-type double flip-flops (B2, B3–B4), an 8-input AND gate and the microprocessor MP all on the same card; as has been mentioned, the MOTOROLA MC 6801 (FIG. 6) proves to be particularly suited and simple and is easily included in the assembly according to the present invention. It is however possible to make use either of other types of commercial microprocessor since they provide the same functions in conditions that are at least equivalent or other specialized circuits such as specific counting circuits. It is obvious that numerous variants can be imagined (two 4-input AND gates replacing one 8-input one for example) without falling outside the scope of the present invention. It is also emphasized that these assemblies are preferably produced using fast logic.

Finally, it should be also noted that the quantity of the input signals processed by the device according to the invention is not limited to 8. However the standards of the microprocessors and other electronic circuits or components presently available on a commercial basis are such that the device according to the invention is particularly interesting notably as regards costs when used for the acquisition of from 1 to 8 input signals.

What is claimed is:

1. Device for the acquisition and the processing of N asynchronous and periodic input signals, including a set of N synchronization flip-flops (B1) receiving said input signals and followed by a set of N storage flip-flops (B2) storing occurrences of said input signals coming from said synchronization flip-flops, said set of N storage flip-flops (B2) having an output connected to a single timer input of a microprocessor via an N-input AND gate means which is used for the combined acquisition by said microprocessor of all the occurrences of the input signals, the N synchronization flip-flops being clocked from an internal clock of the microprocessor by a flip-flop (B4) and wherein the N storage flip-flops are reset from said clock by an automatic flip-flop (B3).

2. Device according to claim 1 wherein the synchronization flip-flops are of the edge triggered D-type.

3. Device according to claim 2 wherein the said synchronization flip-flops (B1) are sampled by receiving the clock signals at the CLK input and the input signals at the D input.

4. Device according to claim 3, wherein the storage flip-flops (B2) receive at the CLK input the input signal coming from the output of the corresponding synchronization flip-flops, the $\overline{Q}$ output and D input of the storage flip-flops (B2) being connected while the $\overline{Q}$ output of the storage flip-flops (B2) is connected to said AND gate means.

5. Device according to claim 1, wherein the synchronization flip-flops are sampled at a frequency which is half that of the clock.

6. Device according to claim 1, wherein the automatic resetting of the storage flip-flops is triggered as soon as reading by the said dedicated circuit is complete.

7. Device according to claim 1 wherein the microprocessor is a type 6801, having an OS3 (OUTPUT STROBE) signal used to automatically reset said storage flip-flops.

8. Device according to claim 1 wherein one element computes in real time velocities corresponding to the input signals from data stored in said device.

9. Device according to claim 1 wherein the quantity of the said input signals range from 1 to 8.

10. Device according to claim 1 used in a vehicle anti-skid braking system.

11. Device according to claim 1 used in an assisted steering system for vehicle.

12. Device according to claim 1 used in a controlled suspension system for vehicle.

13. Device according to claim 1 used in a system avoiding the slip of the driving wheels of a vehicle.

* * * * *